United States Patent [19]

Woolum

[11] Patent Number: 4,936,939

[45] Date of Patent: Jun. 26, 1990

[54] FABRIC-REINFORCED CERAMIC MATRIX COMPOSITE MATERIAL

[75] Inventor: Dale E. Woolum, El Toro, Calif.

[73] Assignee: Ceracom Technologies, Inc., Huntington Beach, Calif.

[21] Appl. No.: 348,041

[22] Filed: May 5, 1989

[51] Int. Cl.[5] ............................................. B32B 31/00
[52] U.S. Cl. ...................................... 156/285; 156/245
[58] Field of Search ................................. 156/245, 285

[56] References Cited

U.S. PATENT DOCUMENTS

| | | | |
|---|---|---|---|
| 3,977,294 | 8/1976 | Jahn | 89/36 A |
| 4,133,928 | 1/1979 | Riley et al. | 428/255 |
| 4,284,664 | 8/1981 | Rauch, Sr. | 427/180 |
| 4,316,925 | 2/1982 | Delmonte | 428/105 |
| 4,482,385 | 11/1984 | Satkowski et al. | 106/97 |
| 4,666,520 | 5/1987 | Bright et al. | 106/97 |

Primary Examiner—James J. Bell
Attorney, Agent, or Firm—Klein & Szekeres

[57] ABSTRACT

A graphite fabric-reinforced ceramic matrix composite material is fabricated from multiple plies of graphite fabric saturated with a slurry of an aqueous alkali silicate and a powdered ceramic. The slurry-saturated plies, laid up on a pattern, are vacuum-bagged and cured at elevated temperatures, either in an oven, or, in a preferred embodiment, in an autoclave under elevated pressure. In a preferred embodiment, the fibers of the graphite fabric are metal-plated to provide an outer surface metallization for improved bonding with the alkali silicate. The result is a composite material with the mechanical and thermal characteristics necessary for use in molding tools for the fabrication of other structures made of high temperature composite materials.

21 Claims, 1 Drawing Sheet

FABRIC-REINFORCED CERAMIC MATRIX COMPOSITE MATERIAL

BACKGROUND OF THE INVENTION

This invention relates generally to the field of composite materials and their methods of fabrication. More specifically, it relates to an improved graphite fabric-reinforced ceramic matrix composite material, and to the method of making it.

Fabric-reinforced composite materials have achieved widespread usage, especially in the aerospace industry, where they are used in the fabrication of structural components of aircraft Most common are fiber-reinforced plastics, wherein polymeric resins are reinforced by a fibrous material, typically graphite.

One problem with such polymer-based materials is their inability to withstand high temperatures. Consequently, for high-temperature applications, fiber-reinforced ceramics have been developed that retain their structural integrity at elevated temperatures. Some typical fiber-reinforced ceramics are disclosed in U.S. Pat. No. 4,284,664 to Rauch, Sr.

With the advent of high-temperature composite materials, there has been an increasing need for suitable materials to fabricate the molds used to form the composite materials into components. Such mold-making materials, ideally, should be capable of resisting high temperatures, and they should be sufficiently durable to withstand prolonged use in the fabrication of components. In addition, such mold-making materials must exhibit good thermal stability (i.e., low coefficient of thermal expansion), low porosity, smooth surface finish, high strength-to-weight ratio, and good vacuum integrity, releasability, and reparability. Also, such materials must be capable of being repeatedly (and easily) heated to process temperatures exceeding 250° C., using internally- or externally-applied heat.

A number of different materials have been employed in attempts to fabricate high-temperature molding tools. While each material has exhibited some advantages, each has also presented shortcomings.

For example, monolithic graphite, while exhibiting low thermal expansion and good high-temperature stability, is fragile, and therefore must be fabricated with thick sections to reduce fracturing. As a result, molding tools made with this material tend to be heavy and difficult to heat. Moreover, such tools exhibit poor vacuum integrity, and they are expensive to fabricate.

Molding tools of steel or other metals have been tried. While exhibiting good high-temperature durability, high strength, and good thermal transfer characteristics, the high coefficient of thermal expansion of metal tools makes them dimensionally inaccurate Such tools are, therefore, unsuited for making close-tolerance components.

Graphite-reinforced polymers have good strength-to-weight ratios, low coefficients of thermal expansion, and good vacuum integrity, but, as previously mentioned, they seriously degrade at high temperatures.

Molding tools made of cast cementitious materials offer good high-temperature durability with low coefficients of thermal expansion. Nevertheless, they have low strength-to-weight ratios and poor thermal transfer characteristics. In addition, they exhibit poor vacuum retention, and their porous structure makes it difficult to obtain good releasability and smooth surface finishes. The addition of metal particulate fillers to such cementitious materials, as taught by U.S. Pat. Nos. 4,482,385 to Satkowski et al. and 4,666,520 to Bright et al., provides greater strength and improved thermal transfer characteristics and vacuum retention. Such tools are, however, still very heavy, and they exhibit a sufficiently high coefficient of thermal expansion to render them unsuitable for fabricating close-tolerance components.

Even fiber-reinforced ceramics themselves have drawbacks as mold-making materials. If such materials are produced without pressing or sintering, as taught by the above-referenced patent to Rauch, Sr., they exhibit high porosity, low dimensional accuracy, and poor surface finish. If such materials are made with pressing and sintering, their fabrication becomes very expensive, due to the extremely high temperatures (approximately 1800° C.) and pressures (approximately 1000 PSI, or seventy atmospheres) involved.

There has thus been a long-felt, but, as yet, unsatisfied need for a mold-making material that meets the mechanical and thermal criteria set forth above, and that lends itself to fabrication into molding tools on a cost-efficient basis.

SUMMARY OF THE INVENTION

Broadly, the present invention is a method or process for making fabric-reinforced, ceramic matrix composite materials, wherein multiple plies of graphite fibers are saturated with a slurry of an aqueous alkali silicate binder with a ceramic powder filler. The plies are laminated together and cured in a vacuum bag at elevated temperature and, preferably, elevated pressure.

In a preferred embodiment, the process starts with a model or pattern formed of a room-temperature setting graphite/epoxy composition, capable of withstanding elevated temperatures (.e.g. 175° C. to 230° C.). The pattern is coated with a mold release fluid.

A mold surface ply is then applied to the pattern. The mold surface ply comprises a mat of chopped strand graphite, or metalcoated graphite, saturated with a slurry of equal parts of an aqueous alkali silicate and a powder filler of ceramic powder or a mixture of ceramic and metal powders. Preferably, two mold surface plies are applied to the pattern.

A laminate structure is now built up on the pattern to the desired thickness by applying the appropriate number of plies of graphite fabric, preferably a fabric in which the graphite fibers are coated with a metal. The fabric is saturated with a ceramic matrix slurry comprising, in a preferred embodiment, approximately equal parts aqueous alkali silicate and a ceramic powder filler.

After the plies are laid up to the required thickness, the laid-up plies are vacuum-bagged to the pattern. This procedure involves placing a release fabric over the laid-up plies, on top of which is placed a porous "breather" sheet. The laminated plies, the release fabric, and the breather sheet are then enclosed is a vacuum bag which is sealed around its edges to the surface of the pattern around the periphery of the laid-up plies. Air is then removed from the bag, by means of a negative pressure applied to a vent. As air is removed, atmospheric pressure compacts the laminated plies, with water and entrapped air being displaced into the breather sheet.

The laminated structure, still under vacuum, is cured at an elevated temperature, preferably in an autoclave, where the assembly can be subjected to a positive pressure.

After curing and removal from the oven or autoclave, the laminate and mold can be bonded to any required support structure using the ceramic matrix slurry, with the bond being cured by returning the assembly to the oven or autoclave.

Finally, the assembly is placed in an air circulation oven or furnace for post-curing at temperatures equal to or exceeding the maximum intended service temperature of the molded part.

The resultant structure is a graphite fabric-reinforced ceramic matrix composite material that has the mechanical and thermal characteristics necessary for use as a molding tool that would be subjected to many molding cycles, over a prolonged period of time, at elevated temperatures. Specifically, the composite material made in accordance with the present invention has an excellent strength-to-weight ratio, low porosity, good high-temperature durability, a low coefficient of thermal expansion, and good heat transfer characteristics. Such material exhibits high tensural and flexural strengths, even after repeated and prolonged use at high temperatures, and it is capable of yielding smooth surface finishes on molded parts. All of these advantages are achieved in a material that compares favorably, in overall fabrication costs, to materials that are inferior in some or all of the relevant characteristics.

DETAILED DESCRIPTION OF THE INVENTION

Figure 1:
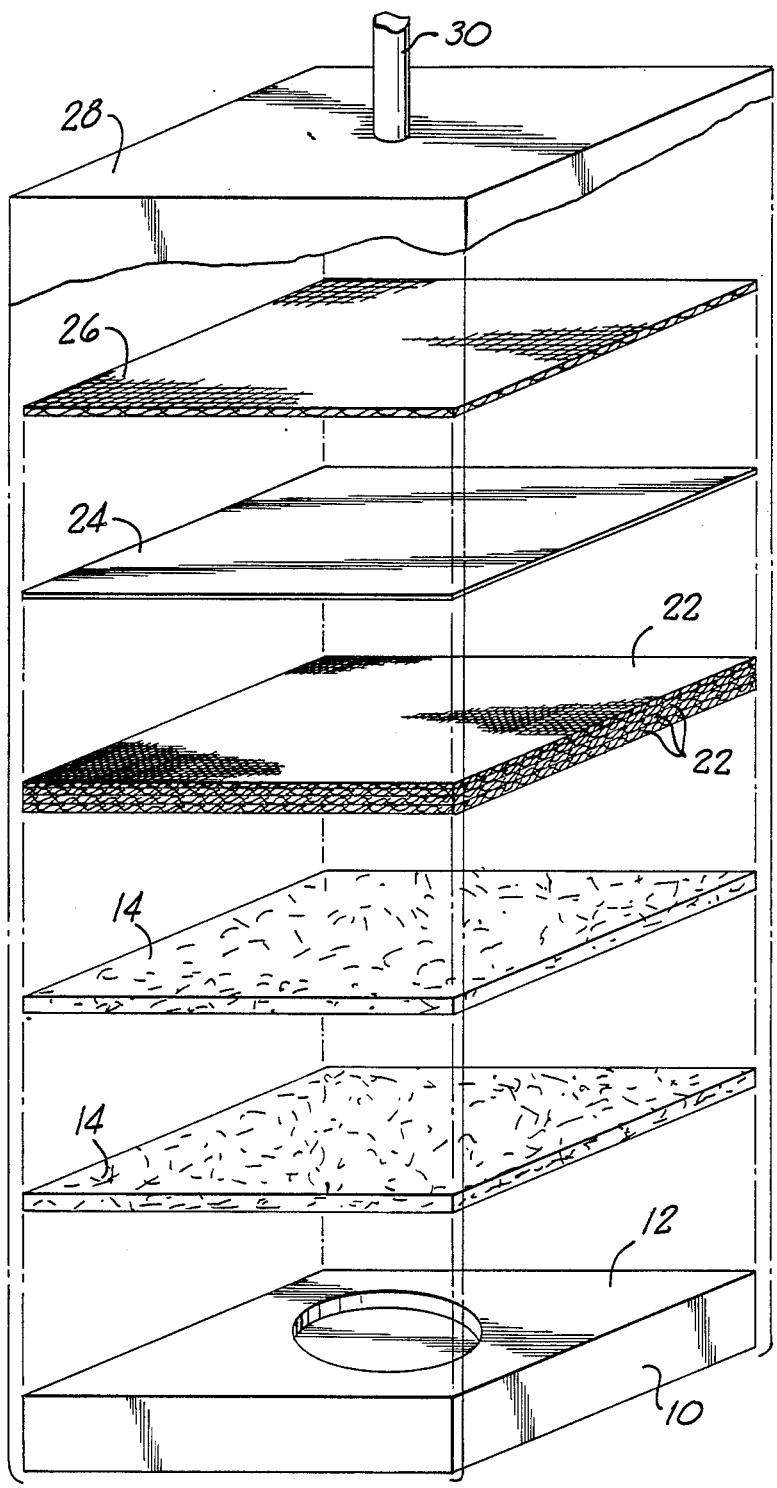
FIG. 1 is an exploded, semi-diagrammatic view showing the component layers or plies of a fabric-reinforced ceramic matrix composite material constructed in accordance with the present invention, along with the mold pattern and the vacuum bag used in the fabrication of the material in accordance with the present invention.

Referring to the drawings, the construction of a fabric-reinforced, ceramic matrix composite material, in accordance with a preferred embodiment of the invention is now described.

FIG. 1 illustrates, in semi-diagrammatic form, the component layers of the composite material, showing the order in which these layers are applied during the fabrication process.

First, a pattern or model 10 (shown in a simplified, idealized form) is provided. The pattern 10 is preferably of a room temperature setting graphite and epoxy composition that is capable of withstanding elevated service temperatures of about 175° C. to about 230° C. Suitable graphite/epoxy compositions are well-known in the art. Such compositions have low coefficients of thermal expansion, and they can be fabricated into patterns with smooth surfaces.

The pattern 10 has a molding surface 12 that is treated with a suitable mold release composition (not shown). Such mold release compositions are commercially available from a number of sources, and the ones best suited to this application are those that employ a PTFE base.

Figure 2:
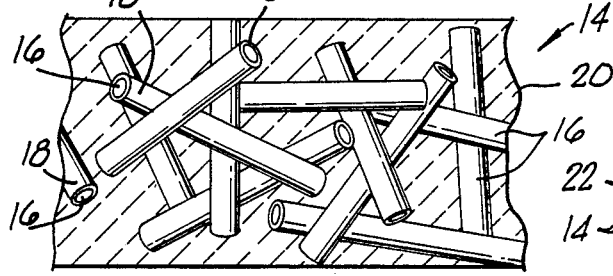
FIG. 2 is a detailed view of a chopped strand graphite mat that constitutes one or more of the layers of the composite material shown in FIG. 1, showing the use of metal-coated graphite strands in the preferred embodiment of the invention.
Figure 3:
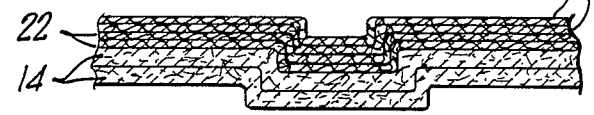
FIG. 3 is a cross-sectional view of a piece of fabric-reinforced ceramic matrix composite material constructed in accordance with the present invention.

A mold surface ply 14 is then applied to the treated molding surface 12. As shown in FIG. 2, the mold surface ply 14 is a thin mat of chopped or continuous strand graphite fibers 16, loosely held together by a tacky binder. No special formulation for the binder is required, only that it be sprayable as a liquid, and quickly settable at room temperature into a weak adhesive. Commercially available hairsprays have been successfully used for this purpose.

As shown in FIG. 2, the graphite fibers, in the preferred embodiment of the invention, have an outer surface metallization layer 18. This metallized layer or coating 18 is preferably formed of an elemental metal that is deposited onto the graphite by electroplating or electroless plating. Although a wide variety of metals would be acceptable for this application, nickel is preferred, primarily because of the commercial availability of preformed mats of nickel-coated graphite fibers from sources such as International Paper Co., of Tuxedo, N.Y. Graphite fibers plated with aluminum, copper, silver, and gold are also available, but the cost of the latter two metals may discourage their use. It is believed that molybdenum, chromium, and even some alloys would also be acceptable. The only criterion is that the metal must be capable of being electroplated or electroless plated onto graphite fibers.

In a specific example, where the graphite fibers are approximately seven microns thick, the metallized layer is approximately 0.5 microns in thickness.

To form the mold surface ply 14, the graphite fiber mat is coated (as by brushing or spraying) with a slurry 20 of an aqueous alkali silicate and a filler of powdered ceramic, or powdered ceramic and powdered metal. The mat is, preferably, saturated with the slurry 20, as shown in FIG. 2. In specific examples, the slurry comprises two parts by weight of aqueous sodium silicate ($Na_2 \cdot 3.22SiO_2$), 40 Baume ("waterglass"), and two parts by weight filler, with approximately 50 percent to 60 percent of the filler, by weight, being powdered molybdenum or chromium, and the balance being fused silica powder. Potassium silicate can be used instead of sodium silicate, and the filler ceramic materials can be powdered aluminum dioxide, finely divided amorphous silica, powdered glass, or mixture of finely powdered aluminum dioxide and silicon dioxide ("China clay"). Various other metal powders can be mixed with the ceramic powder: Tantalum, titanium, tungsten, and nickel may be suitable.

At least one such mold surface ply 14 is laid onto the molding surface 12. In the illustrated preferred embodiment, two mold surface plies 14 are applied. The mold surface plies are gently worked onto the molding surface 12 so as to remove entrapped air.

A laminate of multiple structural plies 22 is now built up on top of the mold surface ply or plies 14. Each of the structural plies comprises a fabric of woven graphite fibers, preferably with a metallized outer surface formed in the manner described above. The fabric is saturated (by dipping, brushing or spraying) with a slurry of an aqueous alkali silicate and a powdered ceramic. In specific examples, laminates were formed from structural plies made of 3K70 graphite plain weave fabric, saturated with a slurry of sodium silicate 40 Baume waterglass binder, filled with −200 mesh fused silica powder. Potassium silicate may be used instead of sodium silicate, and the filler may be powdered glass, finely-divided amorphous silica, alumina powder, or a mixture of aluminum oxide and silicon dioxide ("china clay"). Powdered metals may be added to the filler, if desired, for specific applications, but they typically will not be used in forming the structural plies in order to minimize weight. The typical ratio of alkali silicate to filler would be equal parts by weight, although a ratio of three parts alkali silicate to four parts filler may be used where greater strength is required. In this latter case, an additional five percent by weight of water will have to be used, to maintain a workable viscosity.

After the structural plies 22 are laid up to the required thickness, a release sheet 24 is placed over them. The release sheet 24 is a sheet of fiberglass, nylon, Kevlar, or polyester fabric, coated with PTFE. A breather sheet 26 is then placed over the release sheet 24. The breather sheet 26 is a sheet of porous or open-weave material, such as fiberglass fabric, burlap, or a polyester fabric.

The entire lay-up assembly, comprising the mold surface plies 14, the structural plies 22, the release sheet 24, and the breather sheet 26, is then enclosed in a collapsible, evacuable container or bag 28, which is sealed to the surface of the pattern 10. The bag 28 has a vent 30 that is connectable to a vacuum source (not shown), for the evacuation of air therefrom.

As the air is evacuated from the bag, atmospheric pressure compresses the laminate, displacing excess water from the laminated plies 14 and 22 into the breather sheet 26, and removing air entrapped between the plies.

While the laminate assembly is maintained under the vacuum, the ceramic matrix component of the mold surface plies 14 and the structural plies 22 is cured by the application of heat, with or without the application of positive pressure.

With non-pressurized curing, the bag is placed in an oven, and a first heating period is started, during which the laminated structure is heated to temperatures ranging from about 65° C. to about 96° C. to remove water without boiling. This first heating period lasts from about two hours to about six hours, depending on the thickness of the laminated structure. Then, a second heating period begins, during which the laminated structure is heated to temperatures ranging from about 104° C. to about 232° C. (120° C. to 180° C. preferred) for one to six hours, depending, again, on the thickness of the structure. This second heating step results in the positive dehydration of the alkali silicate.

With pressurized curing (which is preferred), the bag is placed in an autoclave, which is pressurized with a positive pressure ranging from about 1.7 atmospheres (25 pounds/in$^2$) to about 13.6 atmospheres (200 pounds/in$^2$), with a range of 3.4 atmospheres to 6.8 atmospheres (50 to 100 pounds/in$^2$) being preferred The laminated structure in the autoclave, while pressurized, is heated to temperatures ranging from about 104° C. to about 232° C. (120° C. to 180° C. preferred), for a period from about one hour to about six hours, depending upon the thickness of the laminated structure.

After curing, the laminate and the pattern are removed from the autoclave or oven, and removed from the bag. Any required support structure may then be applied to the surface of the cured laminated composite material, using the alkali silicate/ceramic powder slurry in its normal state, or in a thickened, paste-like state (by increasing the percentage of powdered ceramic filler). The assembly is then returned to the autoclave to cure the slurry binding the support structure or foil to the laminate. If the laminate is to be used as a molding tool, a metal foil sheet may be attached to the laminate by this method to improve vacuum integrity.

After final curing, the laminated structure is removed from the pattern and is placed in an air circulating oven or furnace for post-curing at temperatures equal to or greater than the intended service temperature of the article or part formed by the laminated structure. In this post-curing process, the temperature is preferably raised from ambient to the maximum temperature at a rate of approximately 0.55° C. to 5.5° C. per minute.

As described above, the mold surface plies 14 and the structural plies 22 are preferably made with graphite that has a metallized outer surface, although unmetallized graphite can also be used. By way of comparison, the mechanical specifications of two specific examples are given below, both made with 10 ply, 3K70 graphite plain weave fabric (in the structural plies), with a slurry of equal parts aqueous sodium silicate (40 baume waterglass) and −200 mesh fused silica powder, oven-cured in a vacuum bag at one atmosphere and 121° C.

| Type of Test | Specification | Unmetallized Graphite Fabric Laminate | Metallized (Ni) Graphite Fabric Laminate |
| --- | --- | --- | --- |
| Tensile Strength | ASTM-D-638 | 1120 PSI | 4460 PSI |
| Tensile Modulus | | $3.08 \times 10^6$ | $2.13 \times 10^6$ |
| Compressive Strength | ASTM-D-695 | 6700 PSI | 10,060 PSI |
| Compressive Modulus | | $3.66 \times 10^6$ | $3.39 \times 10^6$ |
| Flexural Strength | ASTM-D-790 | 6160 PSI | 8060 PSI |
| Flexural Modulus | | $3.71 \times 10^6$ | $2.2 \times 10^6$ |

It is believed that the increased strength metallized fiber laminate results from increased bonding between the alkali silicate and the metal coating, as compared to the bonding which occurs between the alkali silicate and the bare graphite. In addition, it is believed that the metallizization inhibits the oxidation of the graphite fibers at high temperatures.

An advantage of using the graphite mat mold surface plies 14 is that such plies allow for the uniform reinforcing of the laminate surface without voids between the fiber bundles. Also, these plies tend to minimize ceramic "puddling" between the fiber tows of the structural plies 22, as well as the build-up of unreinforced ceramic matrix deposits on the surface of the structural laminate. Such "puddling" and surface deposits tend to crack during the curing cycle due to shrinkage of the ceramic as a result of dehydration.

By processing the fiber-reinforced ceramic matrix composite using the vacuum-bagging techniques usually associated with fabricating fiber-reinforced polymeric resins, a composite material is produced that has, as compared to conventionallyprocessed fiber-reinforced ceramic composites, improved mechanical characteristics, better thermal transfer characteristics, higher strength-to-weight ratios, and better high temperature durability. Moreover, the resulting structure is less porous, with a smoother surface finish.

The above-mentioned advantages allow composite materials made in accordance with the present invention to be uniquely well-suited to the fabrication of molding tools at a cost that compares favorably with prior art fabrication methods.

What is claimed is:

1. A method of fabricating a fabric-reinforced ceramic matrix composite material, comprising the steps of:
   (a) supplying a pattern with a molding surface;
   (b) coating the molding surface with a mold release composition;
   (c) supplying a mat of graphite strands;
   (d) coating the mat with a first slurry of an aqueous alkali silicate and a ceramic powder;
   (e) applying the coated mat to the molding surface;
   (f) saturating a graphite fabric ply with a second slurry of an aqueous alkali silicate and a ceramic powder;
   (g) laying the saturated graphite fabric ply onto the mat;
   (h) applying a release sheet over the saturated graphite fabric ply;
   (i) applying a sheet of open mesh fabric over the release sheet;
   (j) sealing the mat, the saturated graphite fabric ply, the release sheet, and the sheet of open mesh fabric in an evacuable bag;
   (k) evacuating air from the bag so that atmospheric pressure compresses the layers of material contained therein; and
   (l) while maintaining the evacuation of air from the bag, curing the first and second slurries by the application of heat at temperatures of at least approximately 65° C.

2. The method of claim 1, wherein the graphite strands in the mat and the graphite fabric in the graphite fabric ply have an outer surface metallization.

3. The method of claim 2, wherein the outer surface metallization is a plating of metal.

4. The method of claim 3, wherein the metal is nickel.

5. The method of claim 1, wherein the aqueous alkali silicate in the first and second slurries is selected from the group consisting of aqueous sodium silicate and aqueous potassium silicate.

6. The method of claim 1, wherein the first slurry also includes a powdered metal.

7. The method of claim 1, wherein the ceramic powder in the first and second slurries is selected from the group consisting of fused silica powder, alumina powder, finely divided amorphous silica, glass powder, and china clay.

8. The method of claim 6, wherein the powdered metal is selected form the group consisting of molybdenum, chromium, tantalum, titanium, nickel, and tungsten.

9. The method of claim 1, wherein the step of curing the slurries is performed in an oven with a first curing period at temperatures ranging from approximately 65° C. to approximately 96° C., and then with a second curing period at temperatures ranging from approximately 104° C. to approximatley 232° C.

10. The method of claim 1, wherein the step of curing the slurries is performed in autoclave at a positive pressure of at least approximately 1.7 atmospheres, and at a temperature of between approximately 104° C. and approximately 232° C.

11. A method of fabricating a fabric-reinforced, ceramic matrix composite material, comprising the steps of:
   (a) applying to multiple plies of graphite fiber a slurry of an aqueous alkali silicate and a powdered ceramic;
   (b) laying the multiple plies on top of one another to form an uncured laminate;
   (c) enclosing the uncured laminate in an evacuable bag;
   (d) Evacuating air from the bag so as to compress the uncured laminate by atmospheric pressure; and
   (e) while maintaining the evacuation of the bag, curing the laminate by the application of heat at temperatures of at least approximately 65° C.

12. The method of claim 11, wherein the graphite fibers have a metallized outer surface.

13. The method of claim 12, wherein the metallized outer surface is formed from a plated metal.

14. The method of claim 13, wherein the metal is nickel.

15. The method of claim 11, wherein the curing step comprises the steps of:
   (f) first heating the laminate to a temperature of between approximately 65° C. and approximately 96° C.; and
   (g) then heating the laminate to a temperature of between approximately 104° C. and approximately 232° C.

16. The method of claim 15 wherein the first heating step is performed for approximately two to six hours, and the second heating step is performed for approximately one to six hours.

17. The method of claim 11, wherein the curing step is performed under a positive pressure of at least approximately 1.7 atmospheres, at a temperature of between approximately 104° C. and approximately 232° C.

18. The method of claim 11, wherein the aqueous alkali silicate is selected from the group consisting of sodium silicate and potassium silicate.

19. The method of claim 11, wherein the powdered ceramic is selected from the group consisting of fused silica, finely divided amorphous silica, alumina, glass powder, and china clay.

20. The method of claim 11, wherein the slurry further includes a powdered metal.

21. The method of claim 20, wherein the metal is selected from the group consisting of molybdenum, tantalum, tungsten, titanium, chromium, and nickel.

* * * * *